June 25, 1968 W. C. COOPER 3,390,003
PAPER BASED MOLDING COMPOSITION AND PROCESS FOR MAKING SAME
Original Filed June 1, 1967
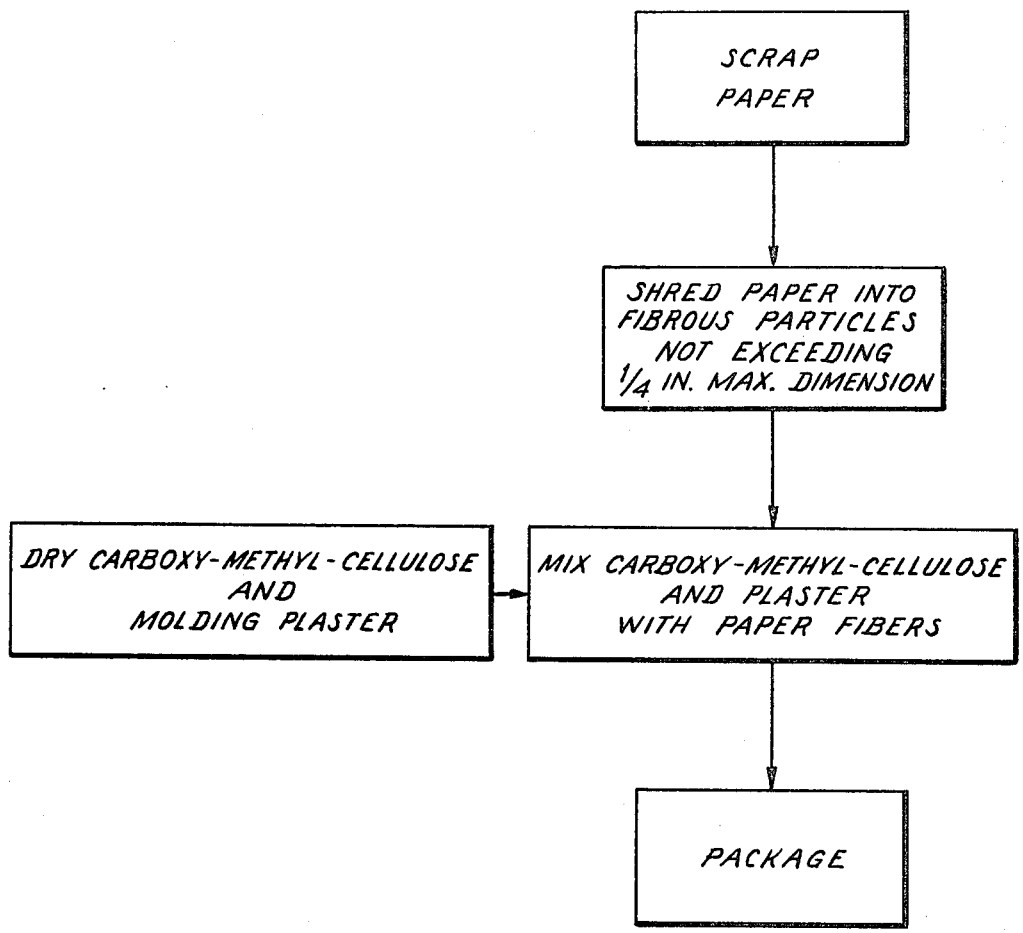
Wanda C. Cooper
INVENTOR.
BY
ATTORNEY

United States Patent Office 3,390,003
Patented June 25, 1968

---

3,390,003
PAPER BASED MOLDING COMPOSITION AND PROCESS FOR MAKING SAME
Wanda C. Cooper, Midland, Tex.
(3032 Wroxton, Houston, Tex. 77005)
Continuation of application Ser. No. 460,207, June 1, 1967. This application Oct. 2, 1967, Ser. No. 672,395
4 Claims. (Cl. 106—193)

ABSTRACT OF THE DISCLOSURE

This invention is directed to a dry paper-based molding composition having paper fibers of a size up to ¼ inch in maximum dimension as the major constituent thereof, and the sodium salt of carboxy-methyl-cellulose as the binding agent. Such composition may be extended with an inert material such as molding plaster for economy in applications where the accompanying loss of strength is acceptable. The material offers advantageous molding characteristics, strength, economy and durability.

---

My invention relates to a dry paper-based molding composition which, upon the addition of water in the proper amount, may be used as a molding material having particular utility in the field of arts and crafts as well as other commercial and industrial uses.

Materials which are used in molding various objects, both useful and ornamental, include papier-mache, molding clay of various types and compositions, and similar materials which are plastic when wet, and present a relatively smooth surface when dry. My invention involves a material of this type which is superior to other materials of which I am aware because of its molding characteristics, strength, economy and durability. It also offers certain other advantages as will be described.

My invention involves reducing scrap paper to fibers of relatively small size, and mixing them with a water soluble cellulose gum of the type identified by the trademarks AKU–CMC, and DRISCOSE, both being essentially the same material. If desired, molding plaster or talc may be added. The resulting dry material is quite stable and easy to handle, and it may be stored for long periods of time with only normal moisture protection. The addition of a measured amount of water and a relatively brief and simple mixing operation produce an unusually high grade of molding composition. Thus, the user is provided with a light and easily handled dry material which is readily available in any desired amount. When an occasion for its need arises, the proper amount of water is added. With a slight amount of mixing, as by kneading within a flexible, impervious bag, the material is quickly ready for use.

In accordance with the foregoing, it is a principal object of my invention to provide a process for preparing a dry paper-based molding composition which can be made ready for any use by the addition of water in the appropriate amount.

It is a further object of my invention to provide a dry paper-based molding composition of unusually high quality which can be conveniently packaged and transported and will retain its useful properties despite long periods of storage.

My process is illustrated in the attached drawing in which the single figure is a flow diagram showing the steps involved in practicing one example of my invention.

The first step is to reduce the paper to small particles or fibers. Economy suggests the use of scrap paper, and although any grade of paper is suitable, it will be apparent that the better grades of scrap paper such as that used in slick paper magazines will produce a product of higher quality.

The means for reducing the paper to a fibrous condition is wholly optional but the product of the grinding or shredding operation should range in size from a condition much like powder or dust up to approximately ¼ inch maximum dimension. The distribution of particle sizes over this range is not critical.

I have found that particles which will pass through a ⅛ inch screen are particularly suitable for use in the fields of arts and crafts. It is apparent that the smaller or more finely divided particles will produce material having a finer texture, whereas the employment of larger particles will result in a coarser texture.

I have found a conventional hammer mill to be a particularly suitable means for reducing paper to the proper condition for use in my process. A mesh screen at the point of exit from the mill will confine the material until it is of proper size.

The material identified as AKU–CMC or Driscose is added to the paper fibers following completion of the grinding step. This product is the sodium salt of carboxy-methyl-cellulose, and is sold under the trademark AKU–CMC by Algemene Kunstzijde Unie of Arnhem, Holland, and under the trademark Dricose by Philips. Such material is commercially available in two grades, "Technical" and "Purified," and although I prefer to use the "Technical" grade, either can be made to produce a useful molding composition. "Technical" grade AKU–CMC contains certain salts which have been removed from the "Purified" grade. Unless otherwise indicated, the term carboxy-methyl-cellulose as used herein will identify the commercially available "Technical" grade.

The reasons for the unique utility of carboxy-methyl-cellulose in a paper-based molding composition are only partially understood at this time, but such material lends itself to ready distribution throughout the paper fibers, accepts water readily and the resulting product has superior molding properties.

Dry molding plaster (hydrous calcium sulfate) or talc (acid magnesium metasilicate) may be added to the mix if desired. Such materials improve the consistency of the molding composition when moist, and the surface texture of the molded product. They also reduce shrinkage and warping. However, they cause a reduction in strength, and normally would not be used when maximum strength is desired.

A reasonably high quality and high strength molding composition is produced when the paper fibers and "Technical" grade carboxy-methyl-cellulose are combined in a weight ratio of approximately six units of paper for each unit of carboxy-methyl-cellulose. A weight ratio of paper to "Technical" grade carboxy-methyl-cellulose in excess of ten to one has a substantial adverse effect on the quality of the resulting material and a weight ratio of less than two units of paper for one unit of "Technical" grade carboxy-methyl-cellulose has a similar consequence. Wholly satisfactory results for most commercial uses are obtained when the weight ratio of paper to "Technical" grade carboxy-methyl-cellulose is held in the range of not more than eight to one and not less than four to one. Within the ranges indicated, strength increases with the amount of carboxy-methyl-cellulose, but as the cost does the same, it is preferable to hold the amount of carboxy-methyl-cellulose to the minimum level consistent with the strength required.

For art and hobby work where high strength usually is not a requirement, a quality product will result from the addition of 4 parts by weight of an inert filler material such as dry plaster or talc to the 6 to 1 mixture of paper fibers and carboxy-methyl-cellulose. A similar amount of filler may be added throughout the ranges specified with no significantly adverse affect on any property except strength. As indicated above, a better finish texture and less shrinkage is produced by the use of a filler material such as plaster or talc.

As previously mentioned, the "purified" grade of carboxy-methyl-cellulose will produce a result comparable to that of the six to one ratio for "Technical" grade material when the ratio of paper to carboxy-methyl-cellulose is approximately thirteen and one-half to one. However the relatively small amount of carboxy-methyl-cellulose requires more attention to mixing in order to achieve even distribution, so I prefer the "Technical" grade.

It is essential that the paper fiber and carboxy-methyl-cellulose be mixed to substantial homogeneity. A large blender in the form of an inverted cone in which the paper and carboxy-methyl-cellulose are introduced and agitated by circulating air has proven to be suitable, but other means, including mixing by hand, serves equally well.

The dry material may be sacked in conventional kraft paper bags or other convenient and economical packaging means. I have found that these bags provide a quite satisfactory protection against moisture during normal storage conditions.

The material produced by my method assumes a consistency much like clay upon the addition of approximately four to five units of water for each unit of the dry mix, by weight, as determined by the degree of plasticity required. If plaster or talc is present, somewhat less water may be required. After molding to any desired shape, the material will dry within a few days, or even less if it is exposed to a small amount of artificial heat.

When dry, the material becomes surprisingly hard and tough. It may be sanded to produce a smooth surface, and it may be sealed and painted. Although there is a small amount of shrinkage during drying, only relatively thick applications of material require special provisions for such shrinkage, and for normal uses, the shrinkage will not be perceptible.

A specific working example of the method of my invention and the product resulting therefrom would begin with a convenient amount, say 100 pounds of scrap paper of magazine quality. This paper is shredded in a hammer mill and removed through a ⅛ inch screen to insure that no particles are larger than ⅛ inch in maximum dimension. The paper fibers will be light and fluffy, and it is convenient to transport them to a centrifugal blender by a current of moving air.

The carboxy-methyl-cellulose and plaster may be introduced to the paper fibers prior to entry into the blender. For 100 pounds of paper, approximately sixteen and one-half pounds of "Technical" grade carboxy-methyl cellulose produces a quality product. At the same time approximately sixty-seven pounds of molding plaster are added. The paper fibers, carboxy-methyl-cellulose and plaster are agitated by air currents within the blender to achieve an homogeneous mixture, and the product can be removed and packaged when mixing is completed.

The process described hereinabove is wholly suitable for preparing the dry material in its basic form. In addition, fireproofing agents, fast drying additives, wetting agents, and special aggregates such as mica, sand, or other materials may be added to the dry product for special effects or requirements. It is necessary only that such additional materials be well mixed with the paper fibers and carboxy-methyl-cellulose and that they display no excessive affinity for moisture which would adversely affect the dry storage characteristics.

Various modifications of my material and process will occur to those skilled in the art. It is my desire to protect by patent all such changes and modifications which fall within the scope of the following claims.

I claim:

1. A dry paper-based molding composition comprising a substantially homogenous mixture of one unit weight of carboxy-methyl-cellulose, approximately four unit weights of a dry material selected from the class consisting of hydrous calcium sulphate and acid magnesium metasilicate, and from two to ten unit weights of dry paper fibers of a size not exceeding one-quarter inch in maximum dimension.

2. A dry paper-based molding composition comprising a substantially homogenous mixture of one unit weight of carboxy-methyl-cellulose, approximately four unit weights of a dry material selected from the class consisting of hydrous calcium sulphate and acid magnesium metasilicate, and from four to eight unit weights of dry paper fibers ranging in size from powder to particles not exceeding one-quarter inch in maximum dimension.

3. The process of making a dry paper-based molding composition comprising the steps of reducing paper to paper fibers ranging in size from powder to one-quarter inch maximum dimension, blending one unit by weight of dry carboxy-methyl-cellulose with approximately four units by weight of a dry material selected from the class consisting of hydrous calcium sulphate and acid magnesium metasilicate, and mixing the blended material with from two to ten units by weight of the dry paper fibers to a condition of substantial homogeneity.

4. The process of making a dry paper-based molding composition comprising the steps of shredding paper to reduce it to a substantially fibrous condition, passing the shredded paper through a ⅛ inch screen, blending one unit by weight of dry carboxy-methyl-cellulose with approximately four units by weight of a dry material selected from the class consisting of hydrous calcium sulphate and acid magnesium metasilicate, combining the blended material with from four to eight units by weight of the dry paper fibers, and mixing the combination to a condition of substantial homogeneity.

No references cited.

JULIUS FROME, *Primary Examiner.*